United States Patent [19]

Miyakawa

[11] Patent Number: 4,670,778
[45] Date of Patent: Jun. 2, 1987

[54] METHOD OF CORRECTING PHOSPHOR LUMINANCE UNEVENNESS IN A COLOR FIBER OPTIC CATHODE-RAY TUBE

[75] Inventor: Tadashi Miyakawa, Kaisei Machi, Japan

[73] Assignee: Fuji Photo Film Co., Ltd., Kanagawa, Japan

[21] Appl. No.: 679,005

[22] Filed: Dec. 6, 1984

[30] Foreign Application Priority Data

Dec. 6, 1983 [JP] Japan .................................. 58-230248

[51] Int. Cl.⁴ ...................... H04N 1/46; H04N 1/036; G01D 9/42; G01D 15/06
[52] U.S. Cl. ....................................... 358/75; 358/163; 358/296; 358/302; 346/110 R; 346/161
[58] Field of Search ................. 358/75, 163, 296, 302; 346/110 R, 161; 354/6; 355/20

[56] References Cited

U.S. PATENT DOCUMENTS

| 3,210,597 | 10/1965 | Siegmund et al. | 358/302 |
| 3,811,007 | 5/1974 | Unger et al. | 358/302 |
| 4,309,720 | 1/1982 | Denham | 358/75 |
| 4,459,512 | 7/1984 | Ohhata | 346/110 R |

FOREIGN PATENT DOCUMENTS

| 12488 | 1/1983 | Japan | 358/302 |
| 51676 | 3/1983 | Japan | 358/163 |
| 194566 | 11/1984 | Japan | 358/302 |

Primary Examiner—James J. Groody
Assistant Examiner—Randall S. Svihla
Attorney, Agent, or Firm—Wenderoth, Lind & Ponack

[57] ABSTRACT

Unevenness of luminance of a plurality of phosphors on a screen provided in the front end of an electron gun type fiber optic cathode-ray tube is corrected by first measuring luminance distributions at positions of picture elements of a picture to be scanned on the respective phosphors and calculating correction amounts needed to even up the measured luminance distributions. The calculated results are then stored in a table. The correction amount corresponding to a recording position is then added to the luminance signal when the picture is recorded and the sum is multiplied by a correction ratio which varies according to the level of the sum of the correction amount and the luminance signal.

4 Claims, 12 Drawing Figures

FIBER OPTIC PLATE

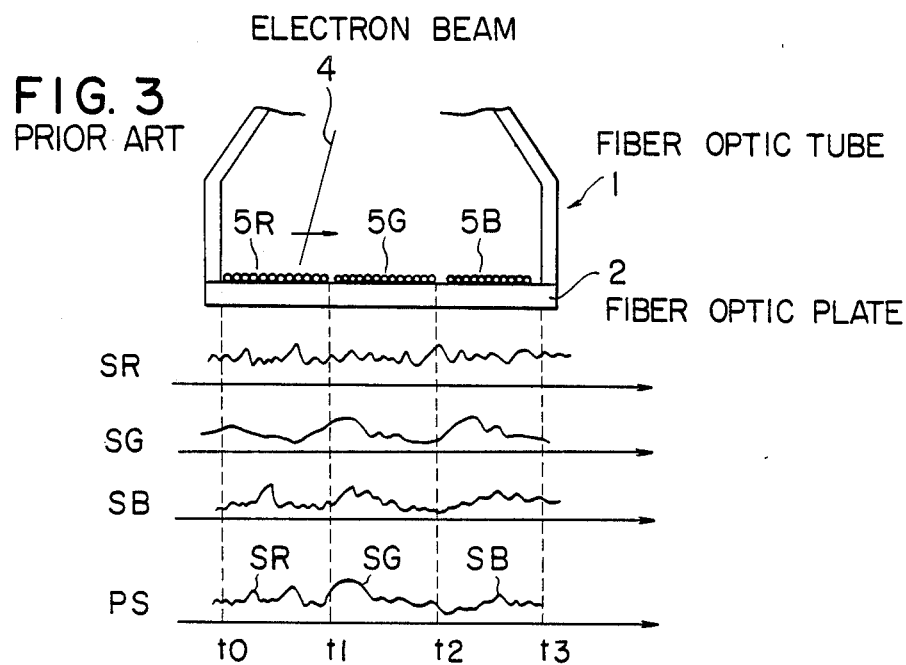
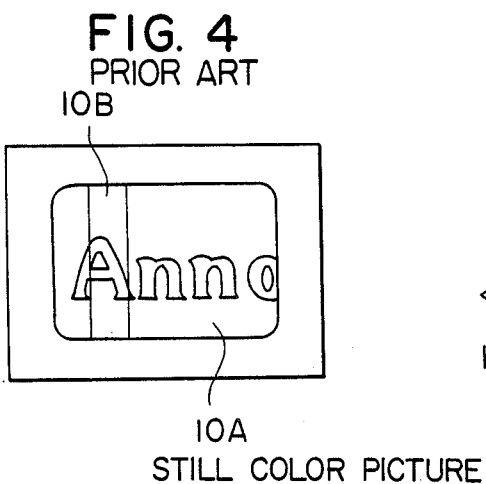
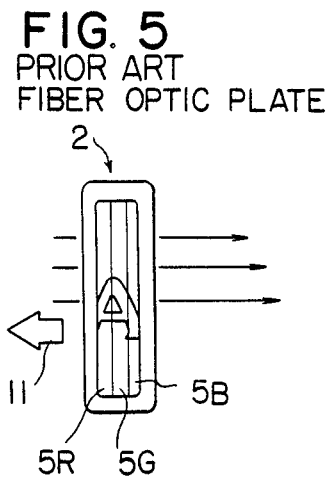

METHOD OF CORRECTING PHOSPHOR LUMINANCE UNEVENNESS IN A COLOR FIBER OPTIC CATHODE-RAY TUBE

BACKGROUND OF THE INVENTION

This invention relates to a method for correcting unevenness of phosphor luminance in a color fiber optic cathode-ray tube.

FIGS. 1 and 2A and 2B show one example of a color fiber optic tube (called FOT hereinafter) 1 which is provided with a substantially rectangular fiber optic plate (called FOP hereinafter) 2 at the front end thereof. A single electron gun 3 is connected to the rear end of the FOT 1 for generating an electron beam 4 and a plurality of fluorescent screens 5 each comprising an illuminant color material are laminated on the inner surface, facing the electron gun 3, of the FOP 2. On the fluorescent screens 5, for example, as shown in FIGS. 2A and 2B, phosphors 5R, 5G, and 5B are applied in a band-like form, the phosphors 5R, 5G and 5B possessing fluorescent characteristics of a red color (R), a green color (G) and a blue color (B), respectively. Information regarding the respective colors of the phosphors 5R, 5G and 5B is sensed through the FOP 2 by a color photo-sensitive material 6 which is used for recording the information and which closely adheres to the FOP 2 and moves upward, for example.

A driving method for the FOT 1 mentioned above will be described hereunder in connection with a color picture signal PS for a raster scan type display. An electron beam 4 from the electron gun 3 is scanned so as to synchronize the red, green and blue phosphors 5R, 5G and 5B formed on the rear surface of the FOP 2 with deflection signals of input picture signals, and when the electron beam 4 passes the fluorescent screens 5, picture signals SR, SG and SB respectively corresponding to the phosphors 5R, 5G and 5B are selected and luminance modulation is carried out with a selected picture signal PS. More specifically, with reference to FIG. 3, during the time interval t0–t1 when the electron beam 4 scans the red phosphor 5R, the picture signal SR representing the red color component is selected and modulated into an electric current of the electron beam so as to illuminate the red phosphor 5R and thereby sensitize the color photo-sensitive material 6. In a like manner, during the time intervals t1–t2 and t2–t3 when the electron beam 4 scans the green and blue phosphors 5G and 5B, the picture signals SG and SB respectively representing the green and blue color components are selected and modulated. Accordingly, the picture signals SR, SG and SB are sequentially recorded timewise on the photo-sensitive material 6, the picture signal PS represents the picture signal SR, SG or SB which is selectively composed in synchronism with the scanning position of the electron beam 4 and the luminance modulation in the FOT 1 can be realized by the picture signal PS.

The principle for carrying out color recording operation using the FOT 1 of the type mentioned above will be described hereunder in conjunction with FIGS. 4 through 6.

FIG. 4 shows a still color picture 10A displayed on a color cathode ray tube (CRT) of a raster scan type, and a rectangular part 10B of the color picture 10A is subjected to the sampling operation in accordance with the raster scanning method and displayed on the FOP 2 of the FOT 1 as shown in FIG. 5. The picture displayed on the FOP 2 is color-separated, in a band-shape, into three colors of red, green and blue, and the luminance thereof is modulated with picture signals SR, SG and SB of the separated colors corresponding to the phosphors 5R, 5G and 5B, respectively. The still color picture 10A is sequentially displayed by a portion of the part 10B thereof while shifting the necessary picture elements in a predetermined direction 11 on the red, green and blue phosphors 5R, 5G and 5B formed in a band-shape on the FOP 2 as shown in an electric light display board. In this manner, the picture which is displayed on the FOP 2 of the FOT 1 and is moved thereon is sensed by the color photo-sensitive material 6 which adheres closely to the front surface of the FOP 2 and is moved at the same speed as that of the displayed picture in the predetermined direction 11. Accordingly, in the case where the electron beam 4 crosses the red phosphor 5R to carry out the luminance modulation, information regarding only the red color in the inputted picture signal is recorded as a latent image by the color photo-sensitive material 6. In the same manner, information regarding the green and blue colors are color-separated and exposed, in a band-shape, by the color photo-sensitive material 6. Thus, one sheet of the completed color latent image picture is recorded by the color photo-sensitive material 6 by moving the sensitive material in synchronism with the display picture and recording them in an overlapping manner.

Since the FOT 1 and the photo-sensitive material 6 of the type described above have uneven sensitivity characteristics with respect to the respective color and output picture element positions, a high quality picture output cannot be obtained when the beam irradiates the illuminating positions of the respective phosphors under the same operating conditions.

SUMMARY OF THE INVENTION

An object of this invention is to provide a method for correcting the unevenness of phosphor luminance in a color fiber optic tube to effectively correct the unevenness of the luminances at the output picture element position of respective phosphors.

Accordingly, an object of the present invention is to provide a method for correcting the luminance unevenness of a plurality of phosphors on a screen provided at the front end of an electron gun type fiber optic tube so as to each exhibit different fluorescent colors in a band-shape, and the method is characterized by the steps of measuring luminance distributions at positions of picture elements of a picture to be scanned on the respective phosphors by a beam from the electron gun, calculating a correction amount needed to even out the measured luminance distributions, storing the calculated correction amount in a table, adding the correction amount corresponding to a recording position to a luminance signal when the picture is recorded, and multiplying the sum by a correction ratio in accordance with the sum of the luminance signal and the correction amount.

According to the method of correcting the luminance unevenness in accordance with the present invention, since a voltage for preliminarily making the distribution of the amount of luminance of a color fiber optic tube constant is obtained and stored in a table and the voltage is then corrected to even out the luminance amount by reading out the corrected data, the luminance unevenness of the picture output can be eliminated. In addition, since the correction amount regarding the unevenness of the luminance is controlled so as to have a suitable value in response to the magnitude of the picture signal, the unevenness of the picture can also be effectively eliminated.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a view for explaining the operation of the fiber optic tube shown in FIG. 1;

FIGS. 4 through 6 are views illustrated for explaining the scanning condition of the fiber optic tube, respectively;

DESCRIPTION OF THE PREFERRED EMBODIMENT

Figure 1:
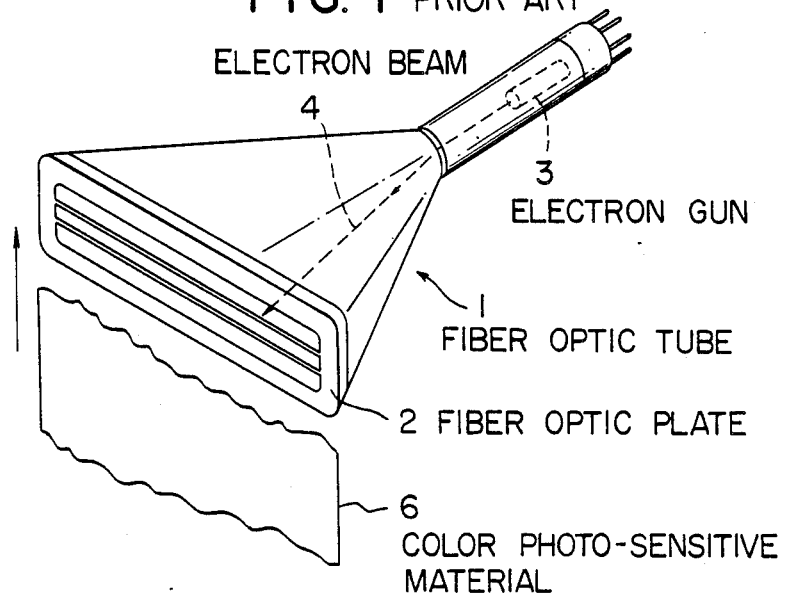
FIG. 1 shows a perspective view of a fiber optical tube to be utilized for this invention.
Figure 2A:
FIGS. 2A and 2B show front and side views of a fiber optic plate attached to the front end of the fiber optic tube shown in FIG. 1.
Figure 2B:
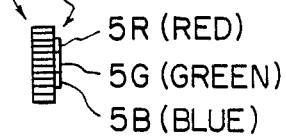
Figure 6:
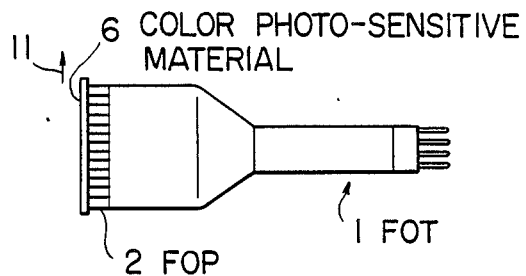
Figure 7:
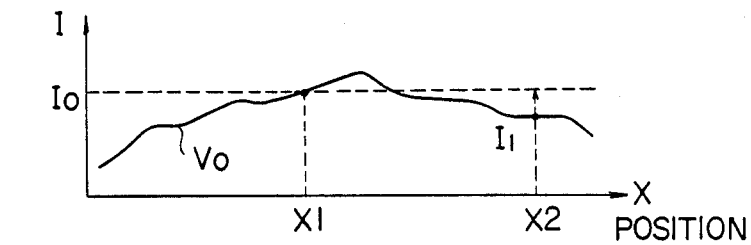
FIGS. 7 through 9 are graphs for explaining the principle of the method according to this invention.

When an electron beam 4 is scanned with a constant voltage $V_0$ in longitudinal direction of the phosphors 5R, 5G and 5B of the color FOT 1 shown in FIG. 1 and FIGS. 2A and 2B to illuminate the phosphors 5R, 5G, and 5B the luminance I with respect to the scanning position X is changed due to the irregularity of the phosphors as shown in FIG. 7, for example. More specifically, in the case where the luminance I at the position X1 of the phosphor is the standard luminance $I_0$, the luminance I changes in accordance with the position X of the phosphor, and for example, the luminance at the position X2 becomes $I_1$ which is lower than the standard luminance $I_0$. In order to make the luminance $I_1$ at the position X2 equal to the standard luminance $I_0$, it is necessary to increase the luminance by adding a correction voltage to the constant voltage $V_0$.

Regarding the voltage V with respect to the luminance I, the following equation (1) exists between the reference voltage $V_0$ and the correction voltage $\Delta V$ to be applied thereto.

$$\frac{\Delta V}{V_0} = k \cdot \frac{(I_0 - I)}{I_0} \quad (1)$$

Namely, the correction voltage $\Delta V$ is expressed as, $$\Delta V = k \cdot V_0 \cdot \frac{(I_0 - I)}{I_0} \quad (2)$$

Figure 8:
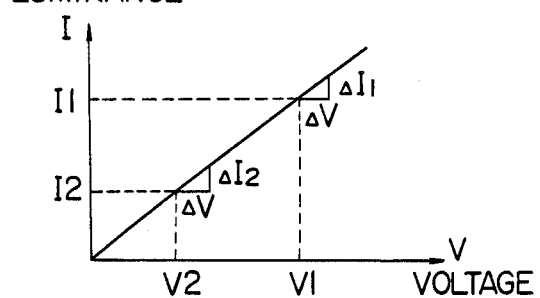
Figure 9:
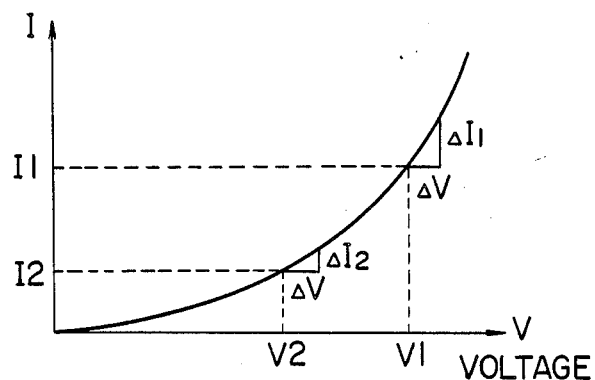

The luminance I of the color FOT 1 will become equal to the standard luminance $I_0$ throughout the whole surface of the phosphor by obtaining the correction voltage $\Delta V$ with respect to all the picture elements of the phosphor and adding the correction voltage $\Delta V$ to the reference voltage $V_0$ in accordance with the position X (voltage V) of the phosphor. In this example, although there is described a system in which the reference voltage is $V_0$ and the standard luminance is $I_0$ at that voltage $V_0$, in a system in which an illuminant luminance I varies linearly with respect to an applied cathode voltage V, the variation of the luminance I with respect to the variation of the voltage V is always constant as shown in FIG. 8, i.e. $\Delta I_2 = \Delta I_1$, regardless of the magnitude of the voltage. In such case, when the always constant correction voltage $\Delta V$ is added regardless of the magnitude of the voltage, the luminance always increases constantly, so that the luminance is over-corrected at a low voltage point and is under-corrected at a high voltage point. Taking this fact into consideration, according to this invention, the luminance I is determined to change in the form of an exponential function with respect to the voltage V as shown in FIG. 9, in which a correction luminance with respect to the correction voltage $\Delta V$ of a high voltage $V_1$ is made to be $\Delta I_1$ having a large variation of the luminance and a correction luminance with respect to the correction voltage $\Delta V$ of the low voltage $V_2$ is made to be $\Delta I_2$ having a small variation of the luminance, thereby adjusting the variation of the luminance according to the magnitude of the voltage V. Thus, the luminance is changed to a large extent at a high voltage position and to a small extent at a low voltage position so as to thereby balance and correct the unevenness of the luminance. The main object of this invention is to perform this correction in a small scale and with a simple electrical circuit. Since the unevenness of the luminance is mainly based on the unevenness of the illuminant efficiency, the luminance I(X) at the position X is expressed as follows:

$$I(X) = \eta(X) \cdot I_0 \quad (3)$$

where $\eta(X)$ is the relative efficiency with respect to the position X. The correction of the luminance I(X) can be effected by multiplying a certain number which is proportional to $1/\eta(X)$ by the standard luminance $I_o$. However, when this multiplication is effected by means of an electrical circuit, a high cost or an increased cost will be involved regardless of whether an analog system or a digital system is used in addition to causing a reduced speed due to the correction. In order to eliminate this problem, according to this invention, this correction is effected by the addition of a digital value. In the case of such a correction based on the addition of a digital value, the change of the correction voltage due to the applied voltage, i.e. the level of the illuminant luminance, does not result in simplification of an electrical circuit to carry out this correction. For this reason, it is preferable to exhibit the relationship between the illuminant luminance I and the applied voltage V as an exponential function so as to automatically adjust the effect of the added amount to the variation of the luminance.

The method according to this invention will be described more specifically hereunder.

If all of the picture elements of the respective phosphors 5R, 5G and 5B cause a fluorescence with a constant driving voltage $V_0$, and assuming that at this time the luminance at the position X is $I(X_0)$, and that a correction voltage for establishing $I(X) = I(X_0)$ with the standard luminance $I(X_0)$ for a certain picture element $(X_0)$ is expressed as $\Delta V(X)$, then the following equation is satisfied.

$$V(X) = V_0 + \Delta V(X) \quad (4)$$

The correction voltage ΔV(X) is written in a table of a random access memory (RAM) or a read only memory (ROM), and the relationships $$(dI/dV) \propto I \qquad (5)$$

$$I \propto e^{kV} \qquad (6)$$

are satisfied in order to make effective the same correction voltage ΔV(X) for the different luminance levels. For this purpose, the gradation is set so that the luminance I can vary exponentially with respect to the driving voltage V as shown in FIG. 9. According to the setting of this gradation, the equation $$\Delta I_2/\Delta I_1 = I_2/I_1 \qquad (7)$$

is established thereby to change the luminance in response to the magnitude of the driving voltage V.

Figure 10:
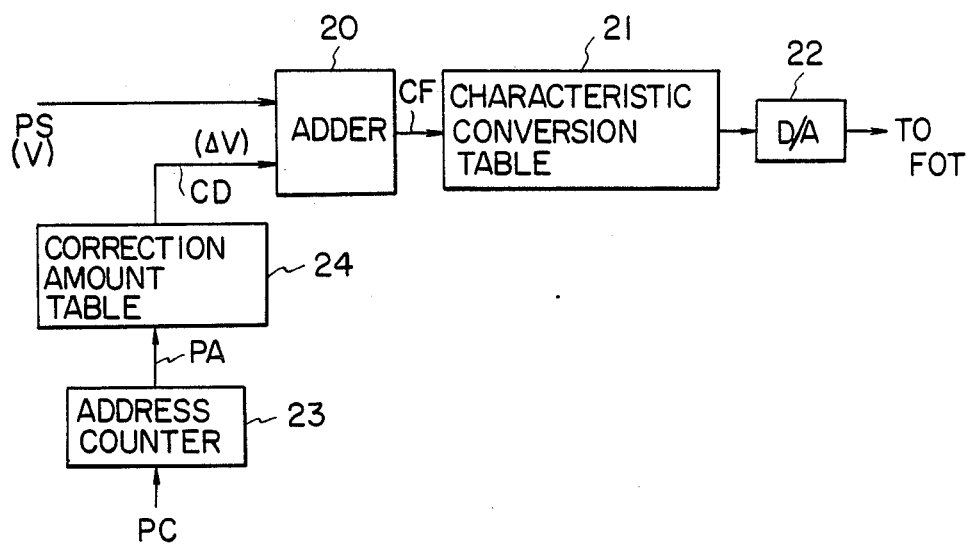
FIG. 10 shows a block diagram of an apparatus for carrying out the method according to this invention.

FIG. 10 is a block diagram showing one example of an apparatus for carrying out the method according to this invention, in which a picture signal PS is transmitted into an adder 20 as a voltage signal V. Picture element clock pulses PC corresponding to the picture signal PS are counted by an address counter 23 and a picture element address PA which is the counting result of the address counter 23 is inputted into a correction amount table 24 in which a correction voltage is preliminarily stored. The correction voltage ΔV which was explained hereinbefore in conjunction with FIGS. 7 through 9, is outputted from the correction amount table 24 as correction data CD, and is thereafter inputted into the adder 20. In the adder 20, the voltage V represented by the picture signal PS and the correction data CD from the correction amount table 24 are added and data CP obtained by this addition is then inputted into a characteristic conversion table 21 as corrected data CF. Characteristic data outputted from the characteristic conversion table 21 is converted into an analog signal by a digital-to-analog (D/A) converter 22 and then fed to a cathode of the fiber optic tube (FOT) as a luminance signal. The characteristic conversion table 21 operates to convert the corrected data CF from the adder 20 into an exponential function as shown in FIG. 9 in connection with the illuminance of the FOT and when the corrected data CF is large, a luminance amount to be corrected is increased, whereas when the corrected data CF is small, the luminance amount is decreased so as to thereby effectively carry out an entirely balanced correction of the picture.

The correction table 24 may comprise the ROM or RAM to beforehand obtain the luminance amount of the FOT with the constant driving voltage, to also contain voltage values with the constant luminance amounts and to store in tabular form digital values of the voltage value. In this case, when the characteristics are distributed with respect to the respective phosphors 5R, 5G and 5B, the digital values of the voltage have to be stored independently with respect to the phosphors 5R, 5G and 5B.

Figure 11:
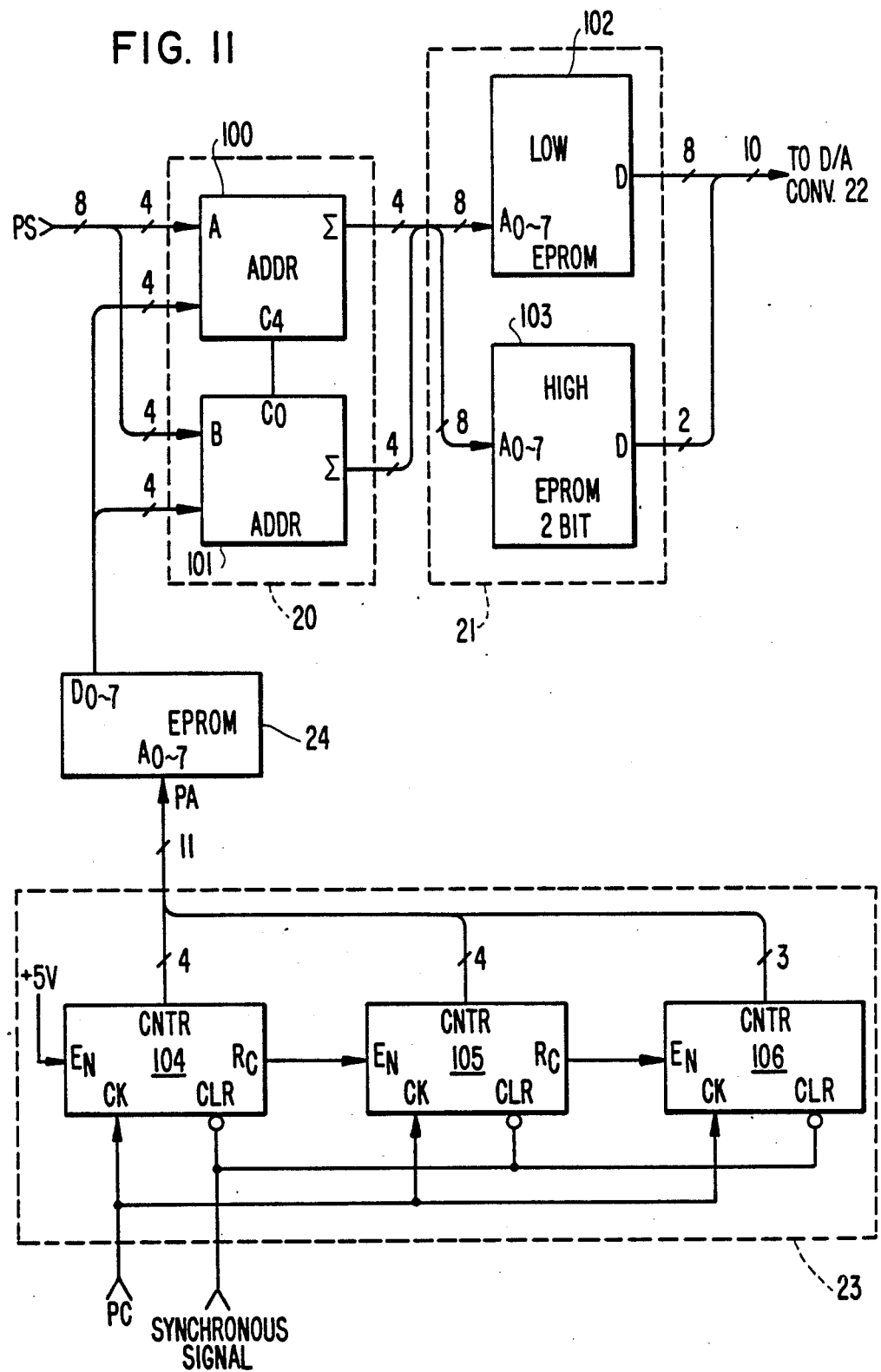
FIG. 11 is a more detailed version of the block diagram illustrated in FIG. 10.

FIG. 11 is a more detailed version of the block diagram of FIG. 10 and illustrates the elements which constitute the various elements of FIG. 10.

As a point of information, adders 100 and 101 which constitute adder 20 may be fabricated from Texas Instrument integrated circuit part number 74LS283, for example.

The EPROM elements 102 and 103 which constitute the characteristic conversion table 21 may be fabricated from INTEL integrated circuit part number 2732 while the EPROM which constitutes the correction amount table 24 may be fabricated from INTEL integrated circuit part number 2764.

Lastly, the address counter 23 which is constituted by counters 104-106 may be fabricated from Texas Instrument integrated circuit part number 74LS163.

The characteristic conversion table 21 has eight digital input bits $D_{IN}$ and ten digital output bits $D_{OUT}$, for example. The table may be programmed to operate in accordance with the following formula:

$$D_{OUT} = \text{INT}[c\{\exp(k \cdot D_{IN}) - b/4\}]$$

where INT means taking the integer of the value in the square brackets and $c=600$ and $k=1.5 \times 10^{-3}$. In addition, b is the minimum value of $D_{OUT}$ for illuminating the fiber optic tube. Note, however, that the value of $D_{OUT}$ is never less than zero.

The correction amount table 24, for example, converts an 11 bit digital signal PA into an 8 bit digital signal CD. The actual programming of the EPROM constituting the correction amount table is performed in accordance with the values obtained by measurements.

The operation of the adders 100 and 101 of adder 20 and the operation of the three digital counters 104-106 of address counter 23 would of course be apparent to one skilled in the art and as noted above, these elements are commercially available. Accordingly, a detailed description thereof has been omitted for the sake of brevity.

It should be understood that many modifications and adaptations of the invention will become apparent to those skilled in the art and it is intended to encompass such obvious modifications and changes in the scope of the claims appended hereto.

What is claimed is:

1. A method of correcting for unevenness of luminance of a plurality of bands of phosphors fluorescing in different colors disposed on a screen provided in the front end of a single electron gun type fiber optic cathode-ray tube comprising the steps of:
   measuring the luminance of said plurality of phosphor bands at a plurality of scanning positions on each phosphor band when said phosphor bands are scanned with an electron beam emitted from said electron gun when said electron gun is driven by a constant signal;
   calculating a correction amount to be added to said constant signal for each scanning position on said phosphor bands to cause the measured luminances at all of the scanning positions on said phosphor bands to become equal to one another, and storing the calculated correction amounts in a table;
   adding said correction amounts to a luminance signal representative of a picture to be recorded by said fiber optic cathode-ray tube to provide a corrected luminance signal; and
   multiplying the corrected luminance signal by a correction ratio which varies in accordance with the level of the corrected luminance signal.

2. A method according to claim 1, wherein the correction ratio varies exponentially with respect to the level of the corrected luminance signal.

3. A method according to claim 1, wherein when the level of the corrected luminance signal is large, the correction ratio is made large, and when the level of the corrected luminance signal is small, the correction ratio is made small.

4. A method according to claim 1, wherein said phosphors fluoresce in red, green, and blue colors.

* * * * *